Figure 1:
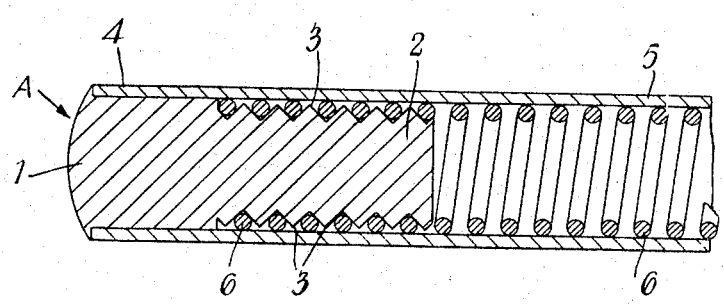

United States Patent Office 3,312,043
Patented Apr. 4, 1967

3,312,043
HYDROGEN DIFFUSION TUBES
Peter Allen Sexton, Hayes, England, assignor to Johnson Matthey & Company Limited, London, England, a British company
Filed Nov. 12, 1964, Ser. No. 410,477
6 Claims. (Cl. 55—158)

This invention relates to improvements in and relating to hydrogen diffusion tubes for use in the separation of hydrogen from gaseous mixtures containing hydrogen or in the purification of hydrogen gas.

The separation of hydrogen from gaseous mixtures or the purification of hydrogen gas is usually effected by contacting the gas with the outer surface of a tube, formed of hydrogen permeable material, closed at one end and open at the other end, whereby the hydrogen passes through the wall of the tube into the interior thereof from which it is suitably collected via the open end thereof, whilst the other constituents of the gaseous mixture or the impurities in the gas are prevented from so passing.

In operating the process, the diffusion tube, which may be formed of pure palladium or a palladium alloy, such as a 25% silver-palladium alloy is generally heated to a temperature of at least 300° C., and possibly as high as 700° C., and the gas or gaseous mixture to be treated is at a pressure of about 500 p.s.i.

The combined effect of the temperature to which the tube is heated and the pressure differential which exists between the exterior and the interior of the tube has been found frequently to result in distortion or flattening of the tube, with consequent reduction in the effective diffusion area of the tube, or even in the cracking of the tube.

To overcome this disadvantage it has been proposed in British Patent No. 966,122 to arrange in the tube a stiffening member preferably in the form of a helical spring or twisted metal tape of stainless steel or other suitable material which will retain its lateral rigidity under the operating conditions. The external diameter of the helical spring or tape is preferably substantially equal to the internal diameter of the tube so as to support the latter entirely against flattening.

The end of the diffusion tube referred to above as the "closed end" is usually sealed by welding or brazing. For example, the tube end may be sealed by gas or argon arc welding or fitted with a nickel or nickel alloy plug and sealed by brazing.

Experience has shown that diffusion tubes sealed in the above manner have not proved entirely satisfactory in use, largely owing to the brazing techniques usually employed which are liable to give rise to excessive porosity. Moreover, whilst the presence of a stiffening spring or tape undoubtedly aids in preventing distortion of the tube and prolongs the effective life of a diffusion tube, difficulties may still arise owing to the fact that the spring or tape is not fixed in position but is allowed to "float" longitudinally in the tube, so that the spring or tape is not maintained in constant contact with the closed end. As a result, collapse of the tube may frequently occur locally immediately behind the nickel plug or other sealing means, in which case the wall of the tube may be sheared against the end face of the plug or be perforated by the end of the spring.

The applicant has now found that the above disadvantages, inherent in the use of existing types of diffusion tube, can be considerably reduced, if not entirely overcome, in a comparatively simple manner by the use of an improved method of, and means for, sealing the tube end.

The object of this invention, therefore, is to provide an improved method of sealing the end of a hydrogen diffusion tube which, at the same time, assists in preventing the distortion of the tube in use.

Another object is to provide a sealing device for the end of a diffusion tube which may, at the same time, be used for assisting the stabilisation of a stiffening spring or tape located in the said tube.

The invention thus comprises a method of sealing the open end of a hydrogen diffusion tube which comprises inserting in the open end of said tube, so as to form a tight fit therein, a plug comprising a body portion formed of material having the same or substantially the same coefficient of thermal expansion as that of the diffusion tube, and being of a size adapted to form a force fit in said diffusion tube and, projecting from said body portion, a threaded extension or spigot of a smaller diameter than that of the body portion, which extension or spigot projects internally of said tube and forms a means for attachment of, or for stabilising, an internal support for said tube.

The invention also comprises a closing plug for sealing the open end of a hydrogen diffusion tube comprising a body portion formed of material having the same, or substantially the same, coefficient of thermal expansion as that of the diffusion tube, with which it is to be associated and being so dimensioned as to form a tight fit in said tube when inserted therein and, projecting from said body portion, a threaded extension or spigot of a smaller external diameter than that of the body portion, said extension or spigot being adapted in use to project internally of said tube and form a means for attachment of, or for stabilising, the internal support for the tube.

Figure 2:
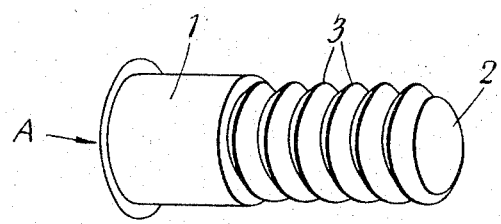

In order that the invention may be fully understood, one embodiment thereof will now be described by way of example by reference to the accompanying diagrammatic drawing, in which:

FIGURE 1 is a sectional side view of a closing plug in accordance with the invention, shown in sealing position in a hydrogen diffusion tube, and FIGURE 2 is a perspective view of the plug shown in FIGURE 1.

Referring to the drawing, the sealing plug A comprises a body portion 1 and, projecting from the said body portion 1, an extension or spigot 2, which is externally threaded as shown at 3. As is clearly seen from FIGURE 1, the body portion 1 is dimensioned so as to form a tight frictional fit in the end 4 of a hydrogen diffusion tube 5, the extension or spigot 2 being of a somewhat smaller diameter than the internal diameter of the diffusion tube 5, so as, as shown in FIGURE 1, to allow of the screwing on to the threaded portion 3 of a helical spring 6 which serves as a stiffening member or support for the tube 5.

The plug A is preferably composed of the same material as the diffusion tube 5; that is to say, if the diffusion tube 5 is made of palladium, the closing plug will also be made of palladium. Likewise, a plug made of a palladium-silver alloy will be used with a diffusion tube of palladium-silver.

In carrying out the method of the invention as applied to this embodiment, the stiffener spring 6 is first threaded on to the outside of the spigot 2 of the plug A, and the assembly of plug and spring is then introduced, spring first, into the open end 4 of the diffusion tube 5 until the body portion 1 of the plug A has been pressed as a force fit into the end 4 as shown in FIGURE 1. The plug A and the tube end 4 are then sealed together by welding to form an air-tight joint therebetween.

As will be readily appreciated, by means of this invention, there is provided an efficient method of, and means for, sealing the open end of a hydrogen diffusion tube and which at the same time enables a stiffening insert provided in the diffusion tube to be supported and/or stabilised, thereby preventing displacement of the stiffening insert away from the tube end, and thus the liability of the tube to collapse at this point.

Whilst in the above one embodiment of the invention has been described by way of example, it is to be understood that the invention is in no way to be regarded as limited thereto, but modifications may be made to the details thereof without departing from the scope of the invention.

What I claim is:

1. A closing plug for sealing an open end of a hydrogen diffusion tube comprising a body portion formed of material having at least substantially the same co-efficient of thermal expansion as that of the diffusion tube with which it is to be associated and being so dimensioned as to form a tight fit in said diffusion tube when inserted therein and an extension projecting from one end of said body portion of smaller external diameter than that of said body portion, said extension being adapted in use to project internally of said tube and to provide means for positioning an internal support member of said tube.

2. A closing plug as claimed in claim 1 in which said plug is formed of palladium.

3. A closing plug as claimed in claim 1 in which said plug is formed of a palladium-silver alloy.

4. A closing plug as claimed in claim 1 in which said extension is formed with an external thread.

5. A hydrogen diffusion unit which comprises a diffusion tube of hydrogen-permeable material, a closing plug sealing one end of said tube comprising a body portion formed of material having at least substantially the same co-efficient of thermal expansion as that of said tube and dimensioned to provide a tight fit in said end of the tube and an extension projecting from one end of said body portion into the interior of said tube and having a smaller external diameter than that of said body portion and a support member within said diffusion tube positioned by said extension.

6. A hydrogen diffusion unit as claimed in claim 5 in which said extension is formed with an external thread and the support member is in the form of a helical spring in threaded engagement with said thread.

References Cited by the Examiner

UNITED STATES PATENTS

| 888,683 | 5/1908 | Andrews | 138—89 |
| 2,820,615 | 1/1958 | Peters. | |

FOREIGN PATENTS 966,122 8/1964 Great Britain.

REUBEN FRIEDMAN, *Primary Examiner.*

J. ADEE, *Assistant Examiner.*